(12) United States Patent
Humbert et al.

(10) Patent No.: US 11,358,892 B2
(45) Date of Patent: Jun. 14, 2022

(54) METHOD FOR RECOVERING PHOSPHORUS FROM SLUDGE AND PLANT THEREOF

(71) Applicant: Veolia Water Solutions & Technologies Support, Saint-Maurice (FR)

(72) Inventors: Hugues Humbert, Claye Souilly (FR); Cedric Mebarki, Aix en Provence (FR); Herve Paillard, La Villedieu du Clain (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 0 days.

(21) Appl. No.: 16/960,626

(22) PCT Filed: Dec. 31, 2018

(86) PCT No.: PCT/EP2018/086905
§ 371 (c)(1),
(2) Date: Jul. 8, 2020

(87) PCT Pub. No.: WO2019/137813
PCT Pub. Date: Jul. 18, 2019

(65) Prior Publication Data
US 2020/0331787 A1   Oct. 22, 2020

(30) Foreign Application Priority Data
Jan. 11, 2018 (EP) ..................... 18151293

(51) Int. Cl.
*C02F 9/00* (2006.01)
*C02F 1/24* (2006.01)
(Continued)

(52) U.S. Cl.
CPC ............. *C02F 9/00* (2013.01); *C02F 1/24* (2013.01); *C02F 1/28* (2013.01); *C02F 1/66* (2013.01);
(Continued)

(58) Field of Classification Search
CPC ...... C02F 9/00; C02F 1/24; C02F 1/28; C02F 1/66; C02F 3/2846; C02F 3/2853;
(Continued)

(56) References Cited

U.S. PATENT DOCUMENTS

| | | | |
|---|---|---|---|
| 2012/0064506 A1* | 3/2012 | Stover | C12P 3/00 435/3 |
| 2013/0134089 A1 | 5/2013 | Cote | |

(Continued)

FOREIGN PATENT DOCUMENTS

| | | |
|---|---|---|
| CN | 106517511 A | 3/2017 |
| WO | 2011089019 A1 | 7/2011 |

*Primary Examiner* — Fred Prince
(74) *Attorney, Agent, or Firm* — Coats & Bennett, PLLC

(57) ABSTRACT

A method, and an installation thereof, for recovering phosphorus from sludge to be treated, said method including:
a stage of pre-acidification of said sludge to be treated including a step of adding an acid, preferably carbon dioxide into said sludge to be treated;
a stage of bio-acidification including a step of acidogenesis and carried out in a reactor having a hydraulic retention time comprised between 1 day to 8 days and, wherein the acidified sludge has a pH comprised between 3.5 to 5.5; and
a stage of treatment including:
a step of solid/liquid separation; and
a step of recovery of phosphates in liquid phase by sorption and/or crystallization, giving a phosphorus depleted water.

15 Claims, 7 Drawing Sheets

(51) Int. Cl.
*C02F 1/28* (2006.01)
*C02F 1/66* (2006.01)
*C02F 3/28* (2006.01)
*C02F 11/04* (2006.01)
*C02F 11/12* (2019.01)
*C02F 11/122* (2019.01)
*C02F 11/123* (2019.01)
*C02F 11/127* (2019.01)
*C02F 1/52* (2006.01)
*C02F 101/10* (2006.01)

(52) U.S. Cl.
CPC .......... *C02F 3/2846* (2013.01); *C02F 3/2853* (2013.01); *C02F 11/04* (2013.01); *C02F 11/122* (2013.01); *C02F 11/123* (2013.01); *C02F 11/127* (2013.01); *C02F 2001/5218* (2013.01); *C02F 2101/105* (2013.01); *C02F 2209/06* (2013.01)

(58) Field of Classification Search
CPC ....... C02F 11/04; C02F 11/122; C02F 11/123; C02F 11/127; C02F 2001/5218; C02F 2101/105; C02F 2209/06; C02F 3/1263; C02F 3/1268; C02F 3/08; C02F 2301/043; C02F 1/42; C02F 2301/046; Y02E 50/30; Y02W 10/10
USPC ................ 210/606, 609, 613, 631, 259, 906
See application file for complete search history.

(56) References Cited

U.S. PATENT DOCUMENTS

2014/0263039 A1    9/2014   Horst et al.
2018/0127790 A1*   5/2018   Logan ....................... C10L 3/08

* cited by examiner

METHOD FOR RECOVERING PHOSPHORUS FROM SLUDGE AND PLANT THEREOF

I. FIELD OF THE INVENTION

The present invention relates to an improved method for recovering phosphorus from sludge. In some specific embodiments, it also relates with an improved method that further enables to produce biogas. More precisely, the improved method is aimed at improving the phosphorus recovery performance and, in specific embodiments, the biogas production yield, while minimizing the use of chemicals.

In addition, the present invention also relates to a phosphorus recovery plant thereof.

II. BACKGROUND OF THE INVENTION

Phosphorus, a component of DNA, is an essential nutrient for life and for the development of every living being. It is a key ingredient in the fertilizers used in agriculture and for animal feed. It is primarily produced by mining, but resources are not limitless and no synthetic substitute currently exists, while demand is growing due to the pressure of worldwide population growth.

Unsurprisingly, wastewater generated by human activities contains a lot of phosphorus, which, if recovered efficiently would enable a sustainable production of phosphate minerals and limit the eutrophication of natural habitats. Besides, coming regulations in European countries, as in Germany and in Austria, will enforce at least 50% phosphorus recovery in municipal wastewater treatment plants.

Moreover, the treatment plants need to deal with P discharge limits at their outlet, so two different strategies are currently used and/or combined to concentrate the phosphorus in sludge: in enhanced biological phosphorus removal processes (so called EBPR or Bio P) the phosphorus is accumulated and biologically bounded in Polyphosphate-accumulating organisms (PAOs) cells, whereas on plant using chemical precipitation the sludge contains iron or aluminum phosphate salts which are only soluble at very low pH.

Therefore, today, most of the methods that can guaranty a performance around 50% phosphorus recovery in every type of sludge are based on chemical leaching in low-pH conditions followed by a precipitation of a phosphate mineral, for example struvite, in basic-pH conditions. Chemical leaching is based on an addition of a strong acid, such as sulfuric acid, in a leaching reactor in order to reach a pH comprised between 2 and 4.5. The sludge thereafter undergoes a solid/liquid separation and the liquid phase is sent to a precipitation reactor. In the precipitation reactor, sodium hydroxide is added to reach a pH comprised between 8 and 9 together with other chemicals such as MgO or $Mg(OH)_2$ in order to precipitate phosphates into struvite crystals. Moreover, because of the strongly acidic conditions required for the chemical leaching, complexing agents need to be added to re-capture the released heavy metals. Thus, these methods have a very high chemical demand, which implies a very high cost of treatment for a given quantity of recovered phosphorus. "Stuttgart" and "Gifhorn" processes, developed through the European Union's Seventh Framework Program for Research "P-Rex", are examples of such methods. "Stuttgart" process is carried out at a pH equal to around 4 and "Gifhorn" project is carried out at a pH of around 4.5. Both processes reach a yield of only 45% phosphorous recovery. If a yield of at least 50% phosphorous recovery was considered to be reached, it is estimated that a pH below 3 would be required.

The "ExtraPhos" process (Budenheim) reduces the operational costs by using and recycling carbon dioxide instead of the previously described strong acids. However the carbon dioxide injection is operated at high pressure, such as 10 bars. This implies specific security issues so as high capital expenses (CAPEX) installations.

In order to reduce the use of additional chemicals, an alternative known from the prior art to the chemical leaching in low-pH conditions, could be natural bio-acidification. The natural bio-acidification process enables natural pH lowering through fermentation by a biomass of organic compounds and without the additional use of chemicals. Because some of the fermented products obtained by fermentation have an inhibiting effect on the biomass, the pH-range that is reached is generally comprised between 5 and 6. This pH range is not low enough to enable an efficient release of phosphates, especially in case of chemical-bounded P. Therefore, the natural bio-acidification followed by a precipitation of a phosphate mineral cannot guaranty a 50% phosphorus recovery target on all types of municipal wastewater sludge. Furthermore, the natural bio-acidification does not lead to a quick and complete production of volatile fatty acids. Volatile fatty acids can be used for example as biogas precursors.

It is also known from prior art that there are digestion processes that produce biogas, mainly methane and carbon dioxide, from sludge. Digestion processes can be qualified of either anaerobic or aerobic depending if they are carried out, respectively, in the presence or in the absence of dioxygen. The theoretical gas production based on organics conversion are similar for all technologies, namely 0.35 $Nm^3$ $CH_4$ (normal cubic meter methane) per kilogram COD (chemical oxygen demand) converted, or 0.7 to 1.1 $Nm^3$ per kilogram organic matter degraded. What differs from one technology to another are the capabilities to degrade this organic matter or COD: residence time (HRT), temperature, pressure or thermal hydrolysis. All these technologies only try to enhance the "readily" available fraction of organic matter to its upmost to increase the biogas production.

III. OBJECTIVES OF THE INVENTION

The invention aims at proposing an improved method for recovering phosphorus from any kind of sludge.

In particular, one of the objectives of the invention is to reach at least 50% phosphorus recovery from any kind of sludge.

In addition, one of the objectives of the invention is to minimize the use of chemicals, especially the use of chemicals to regulate the pH.

Furthermore, another objective of the invention is to reduce the volume of residual sludge. In particular, according to some embodiments, another of the objectives is to reduce physicochemical sludge due to phosphorous precipitation at tertiary treatment.

Another objective of the invention is, at least according to some embodiments, to propose a method for recovering phosphorous which is cost-effective and safe.

Another objective of the invention is, at least according to some embodiments, to further produce biogas. In particular, one objective of the invention is to improve the biogas yield compared to a mere digestion process.

The invention also aims at proposing a compact plant for recovering phosphorous from a sludge adapted to carry out the method of the present invention.

IV. SUMMARY OF THE INVENTION

The present invention entails a method for recovering phosphorus from sludge to be treated. The method includes:
a stage of pre-acidification of said sludge to be treated, giving a pre-acidified sludge; the stage of pre-acidification includes a step of adding an acid into the sludge to be treated;
a stage of bio-acidification of the pre-acidified sludge, giving an acidified sludge; the stage of bio-acidification includes a step of acidogenesis and is carried out in a reactor having a hydraulic retention time comprised between 1 day to 8 days; at a pH comprised between 3.5 to 5.5;
a stage of treatment of the acidified sludge including:
  a step of solid/liquid separation of the acidified sludge giving a slurry and an acidified water; and,
  a step of recovery of phosphates in liquid phase by sorption and/or crystallization giving a phosphorus depleted water, said step of recovery of phosphates being carried out after said step of solid/liquid separation.

Thus, the present invention combines, in a novel and inventive way, a stage of pre-acidification and a stage of bio-acidification in series, to reach a low-pH range of values while removing or at least minimizing the quantity of strong acid to be added to the sludge. The pH-range comprised between 3.5 to 5.5 corresponds to the optimum pH-conditions for acidogenesis. Therefore, the pre-acidified sludge can be transformed quickly and completely into fatty acids, so that the hydraulic retention time of the reactor in which the stage of bio-acidification is carried out, can be reduced to a duration comprised between only 1 day to 8 days. As a consequence, the reactor in which is carried out the stage of bio-acidification can have a reduced size. The pH-range comprised between 3.5 to 5.5 is favorable to an efficient release of phosphates. Therefore, the method of the present invention can guaranty at least a 50% phosphorus recovery from the sludge. The sludge to be treated in the method according to the invention can be any type of organic sludge. For instance, if the method is used for the treatment of municipalities' wastewater, the sludge can be primary sludge, biological sludge or mixed sludge. The organic sludge can also originate from industrial wastewater containing biodegradable organic matter.

The method according to the present invention is particularly adapted for sludge having a content of dry matter between 4 to 100 g/L as a maximum. In addition, the method according to the invention is particularly adapted for sludge having at least a total phosphorous content of 50 mg/L.

In the pre-acidification stage, the acid added into the sludge to be treated can be a mineral acid or an organic acid, and in particular a strong acid or an organic co-substrate.

Preferably, the acid added into the sludge to be treated in the stage of pre-acidification is carbon dioxide ($CO_2$).

Carbon dioxide dissolves in the sludge as carbonic acid ($H_2CO_3$), which is the acidic form of the acid-base couple: $H_2CO_3/HCO3^-$ (pKa=6.37 at the reference temperature of 25° C.). Carbon dioxide is added in the stage of pre-acidification to obtain a pre-acidified sludge having preferably a pH close or inferior to 6.3. At pH values equal or inferior to 6.3, methanogenic bacteria are inhibited. On the contrary, acidogenic bacteria can develop easily. Advantageously, carbon dioxide is added in the stage of pre-treatment to reach a pH comprised between 5.5 and 6.5. Carbon dioxide is preferably injected thanks to a fine bubble injector as the use of small bubbles increases the speed of solvation of carbon dioxide into water. The pressure of injection of carbon dioxide can be comprised between 1 to 5 bars absolute pressure. The pressure of injection of carbon dioxide is preferably above 1.2 bar absolute pressure.

Carbon dioxide can be recycled from cogeneration or from incineration off-gas of the wastewater treatment plant and is significantly cheaper than strong acids. The addition of carbon dioxide in the method according to the invention also enables a reduction of greenhouse gases emissions.

The stage of pre-acidification can be performed in a flotation reactor. The injection of carbon dioxide in a flotation reactor enables to thicken the treated sludge during the pre-acidification stage.

The stage of bio-acidification is a stage in which the pH is lowered by natural fermentation, under anaerobiose, of organic compounds. The stage of bio-acidification is preferably carried out in a separate tank as the one used for the pre-acidification and preferably do not require adding any external inoculum. Thus, the biomass of the stage of bio-acidification originates only from the sludge itself.

Acidogenesis is a specific type of bio-acidification that further enables to convert organic matter, after hydrolysis, into simple organic compounds such as volatile fatty acids (VFAs). VFAs are aliphatic carboxylic acids having two to six carbon atoms. The acidogenesis in the stage of bio-acidification is carried out in a reactor having a hydraulic retention time comprised between 1 day to 8 days under pH control to maintain the reaction at a pH comprised between 3.5 to 5.5. The duration of the hydraulic retention time depends on the temperature to which bio-acidification is carried out. The temperature to which bio-acidification is carried out is generally comprised between 12° C. and 35° C. The higher is the temperature of bio-acidification, the shorter duration of the stage of bio-acidification needs to be.

The pH-range comprised between 3.5 to 5.5 of the acidified sludge is favorable to an efficient release of phosphates. In these conditions, at least 50% of the total phosphate content of the sludge can be dissolved as phosphates in the acidified sludge. The method according to the invention generally enables to dissolve up to 90% of the total phosphate content in the acidified sludge.

The term "phosphates" is not limited to the oxyanion phosphate as such ($PO_4^{3-}$) but also comprises salts or esters of polymeric oxyanions formed from tetrahedral $PO_4^{3-}$ structural units linked together by sharing oxygen atoms (polyphosphates).

If the addition of the $CO_2$ in the stage of pre-acidification is not enough to reach a pH comprised between 3.5 to 5.5 in the end of the bio-acidification stage an additional acid which is not carbon dioxide can be further added during the stage of pre-acidification and/or the stage of bio-acidification. It is an additional means to further adjust the pH before the stage of recovery of phosphates in liquid phase. The injection of an additional acid can be carried out through direct mixing in inlet pipe, indirect mixing through dilution in bypass pipe, or hydroejector.

The additional acid can be a mineral acid or an organic acid, and in particular a strong acid or an organic co-substrate. Some mineral acids are for example HCl, $H_2SO_4$ or $HNO_3$. The three of them are all strong acids. A strong acid is defined as an acid that completely dissociates in an aqueous solution. The injection of a strong acid enables to quickly reduce the pH to a targeted value although the use of strong acids will increase the costs of the methods. An organic acid can be chosen from organic co-substrates (fat, sugar oil, food residue, glucose or sucrose) or organic waste. The injection of organic co-substrate or of organic waste enables to boost the biomass to reduce the pH more rapidly as with only the sludge as a substrate.

The step of solid/liquid separation of the acidified sludge gives a slurry and an acidified water. It can be carried out by any means of sludge dewatering, and preferably by press filter, belt filter, or centrifugation. The method according to the invention generally enables to recover in the acidified water at least 75% of the phosphates present in the acidified sludge.

The step of recovery of phosphates enables to recuperate a phosphorus-based chemical from the acidified water. It is preferably carried out at a pH inferior to 7.5 in order to mitigate the addition of a basis, such as caustic soda.

According to a first embodiment, the step of recovery of phosphates can be carried out by sorption (adsorption, ion exchange, . . . ). The sorption can be on a non-regenerable or regenerable media, in situ or off site.

According to a second embodiment, the step of recovery of phosphates can be carried out by crystallization of phosphates into a phosphate mineral. For the crystallization, calcium or magnesium products can be added in order to obtain a calcium phosphate or a magnesium phosphate (such as struvite). As a magnesium product, $MgCl_2$ can be used. As a calcium product $Ca(OH)_2$ can be used.

Preferably, the stage of treatment of the acidified sludge further includes a step of digestion. The step of digestion enables to produce a biogas. Because the stages of pre-acidification and of bio-acidification enable to increase the VFA content of the sludge compared to the sludge to be treated, the step of digestion of the method according to a preferred embodiment of the invention enables to increase the biogas yield by at least 10% compared to a mere digestion method. VFA increase of at least 10% compared to conventional digestion can be achieved through pH reduction and control. Maintaining pH in 3.5-5.5 range inhibits methanogenics activity (inhibition threshold below pH 6) thus not having "side consumption" or uncontrolled methanogenic development during the phosphorous desorption period (HRT from 1 to 8 days).

According to a first embodiment, the step of digestion is carried out in liquid phase, giving a biogas and a digested liquid. The step of digestion is a methanization and is carried out prior or after the step of recovery of phosphates.

According to a second embodiment, the step of digestion is a digestion of the slurry, giving a biogas and a digested slurry. In this embodiment, the phosphorus depleted water can optionally be added to the slurry for the step of digestion of the slurry.

In some embodiments the digested slurry can be, at least partly, recycled and mixed with the pre-acidified sludge. This enables to increase the total phosphorous recovery and biogas yields.

Preferably, when digestion is not available on a treatment plant, the acidified water is sent to a mainstream wastewater treatment biological system and the step of recovery of phosphates in liquid phase is carried out downstream of said mainstream wastewater treatment biological system. The wastewater treatment biological system can for example include an activated sludge reactor, a moving-bed biofilm reactor, a membrane bio-reactor, etc. This offers the benefit to increase the phosphate concentration in the acidified water for a so-called "tertiary phosphorus recovery" during the step of recovery of phosphates in liquid phase.

The stage of treatment of the acidified sludge can also include an optional step of post-acidification. The step of post-acidification is carried out prior to said step of recovery of phosphates in liquid phase. It enables pH adjustment before the step of recovery of phosphates in liquid phase.

The method of the present invention preferably includes a stage of advanced control of pH of the stage of pre-acidification and/or the stage of bio-acidification. The stage of advanced control takes into account at least one parameter, the at least one parameter being chosen among: the pH for said stage of pre-acidification, the pH for said stage of bio-acidification and the phosphorus recovery performance for said step of recovery of phosphates.

If the stage of treatment of the acidified sludge includes a step of digestion, the at least one parameter can be further chosen among: the pH for the step of digestion and the biogas recovery performance.

The invention also entails a compact plant for recovering phosphorous from a sludge to be treated, adapted to carry out the method of the present invention. The plant includes:

a contact chamber and means for injecting acid into the sludge to be treated, a sludge reactor adapted to bio-acidification with a hydraulic retention time comprised between 1 day to 8 days, means of solid/liquid separation, and means of phosphorus recovery adapted to recover phosphorus from a liquid phase.

In some specific embodiments, the plant can further include a digestor.

In some other specific embodiments, the plant can further include a methanizer.

V. BRIEF DESCRIPTION OF THE DRAWINGS OF THE DRAWINGS

Figure 1:
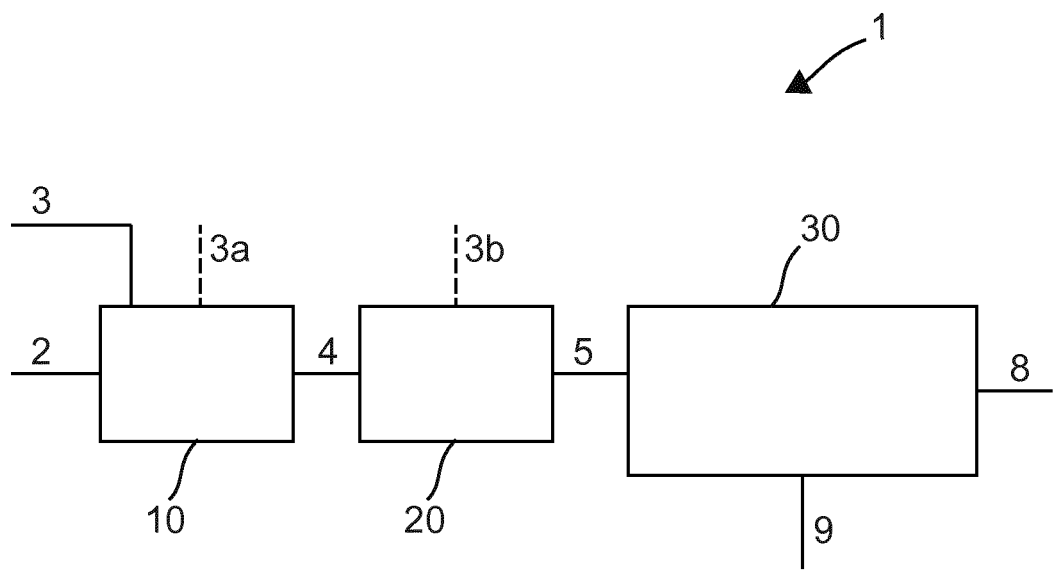
FIG. 1 represents a schematic view of the three stages of the method according to the present invention.
Figure 3A:
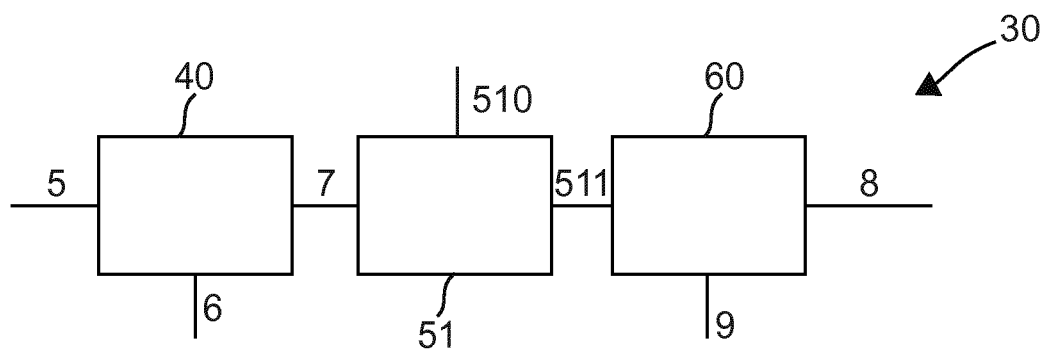
Figure 3B:
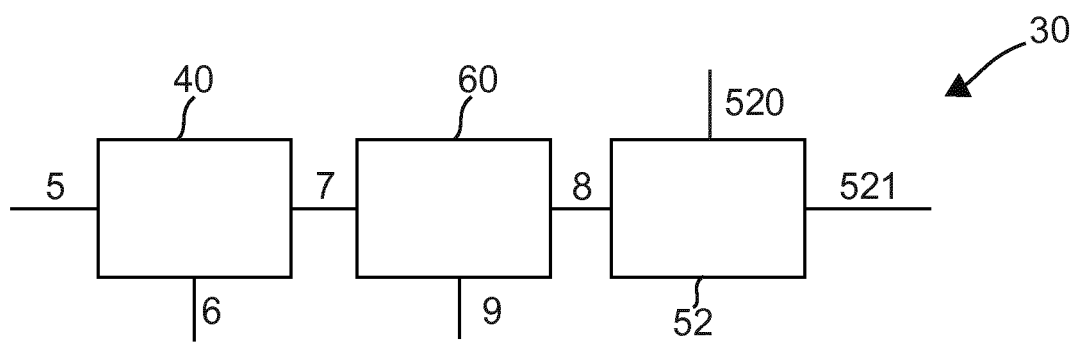

FIGS. 3a and 3b represent a schematic view of the steps of the stage of treatment according to the method of FIG. 1, including a step of digestion in liquid phase carried out prior to (cf. FIG. 3a) or after (cf. FIG. 3b) the step of recovery of phosphates in liquid phase.

Figure 4:
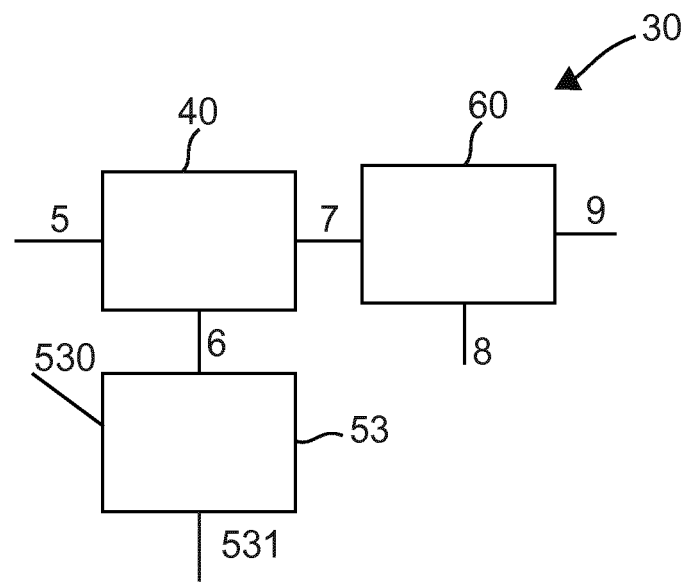

FIG. 4 represents a schematic view of the steps of the stage of treatment according to the method of FIG. 1, including a step of digestion of the slurry.

Figure 5:
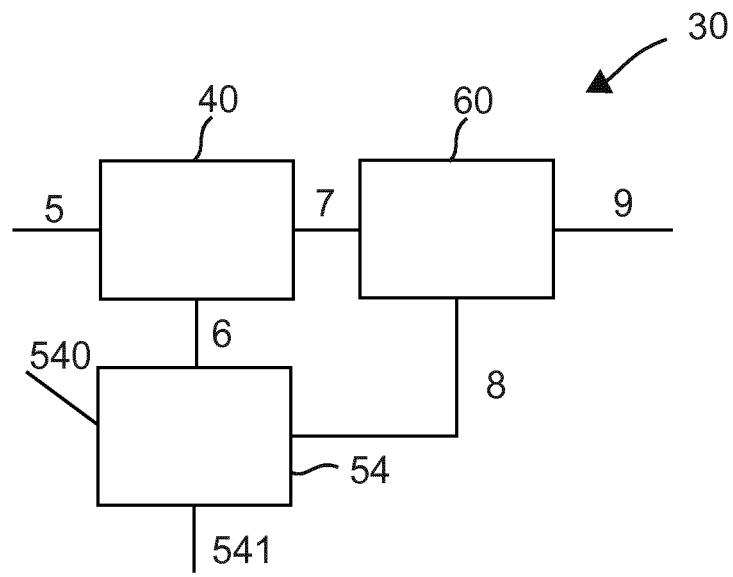

FIG. 5 further represents the embodiment according to which the phosphorus depleted water is added to the slurry for digestion of the slurry.

Figure 6:
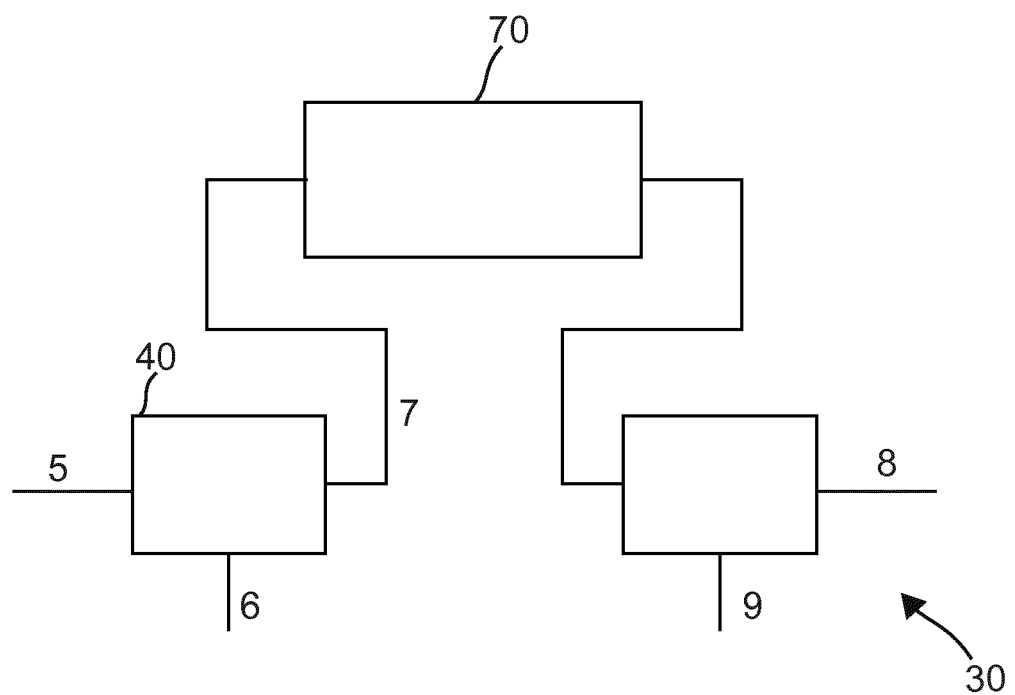

FIG. 6 represent a schematic view of the steps of the stage of treatment according to the method of FIG. 1, in which the acidified water is sent to a mainstream wastewater treatment biological system.

Figure 7:
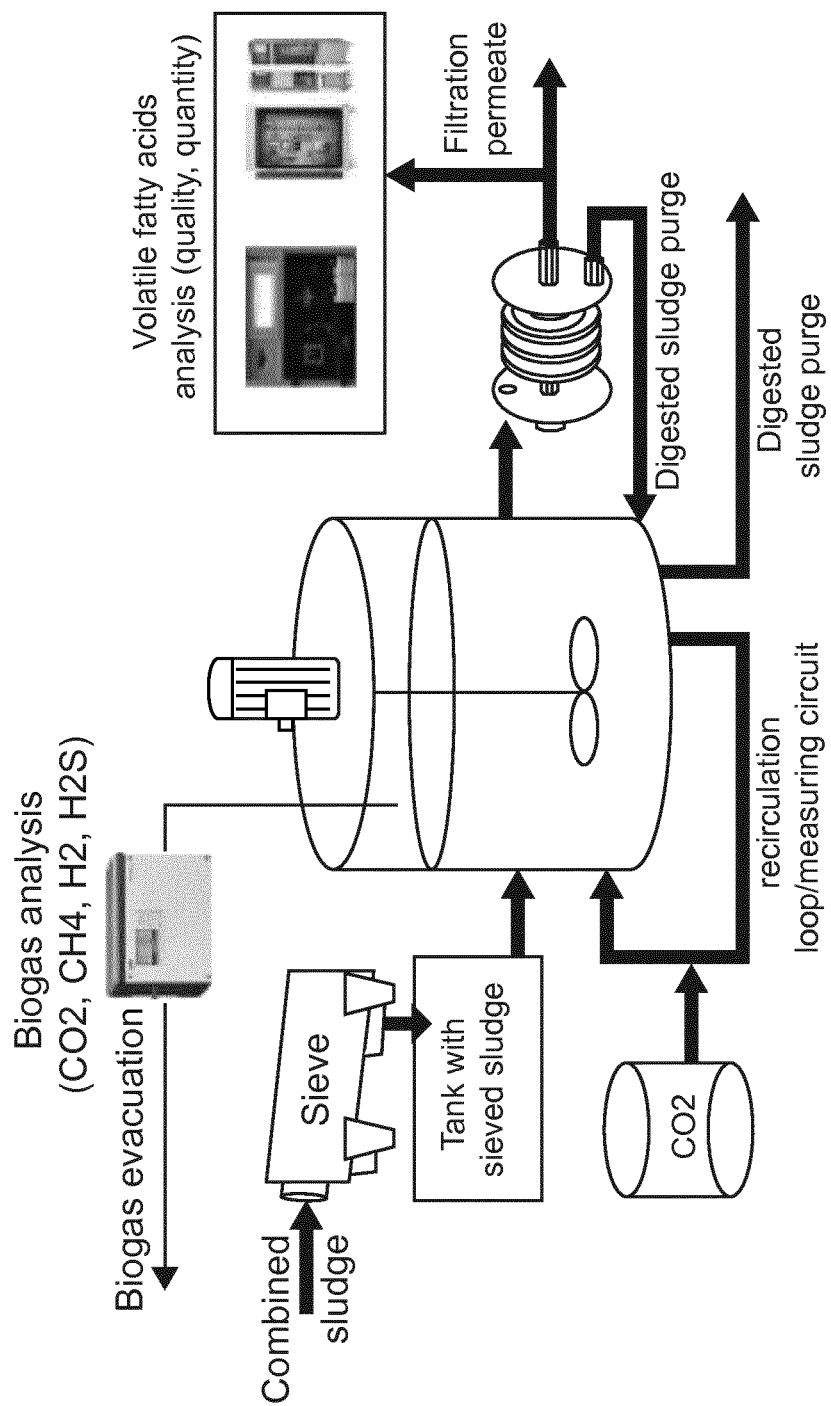

FIG. 7 represents a pilot semi-industrial setup in which have been conducted acidification experiments.

Figure 8:
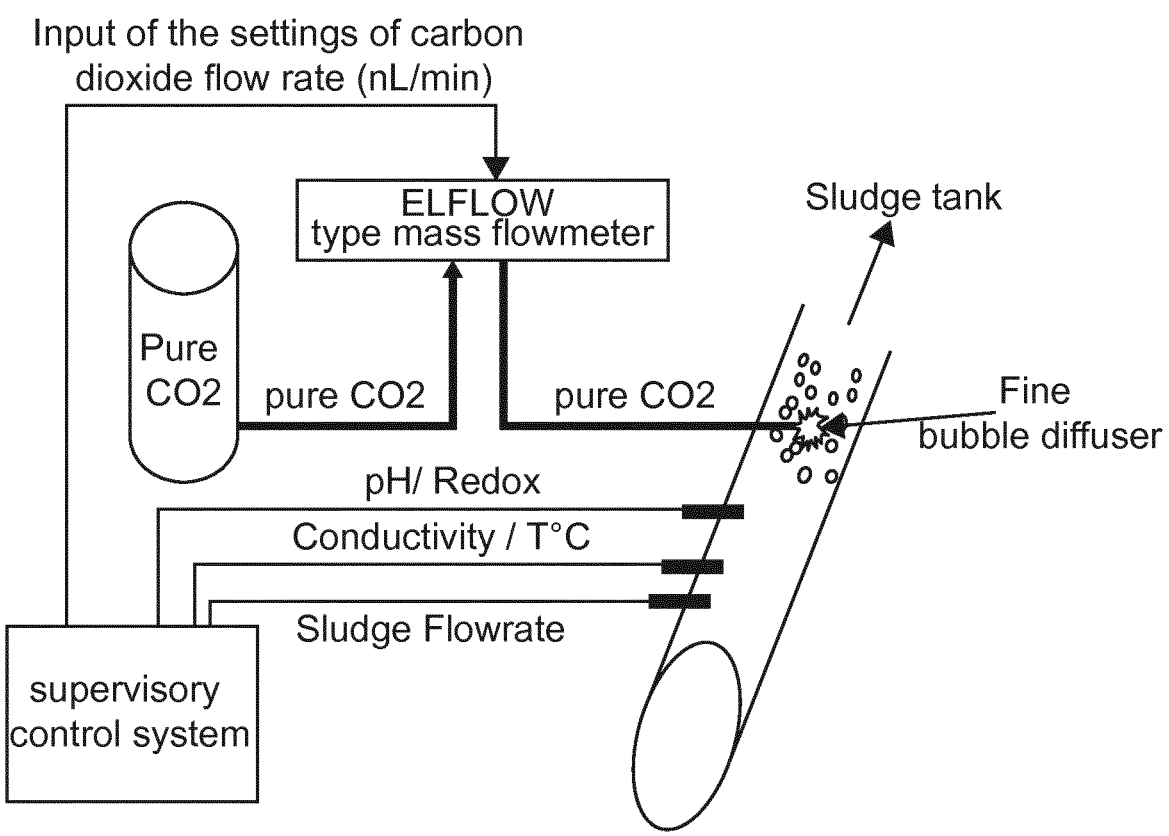

FIG. 8 represents the detail of the $CO_2$ injection system used in the pilot semi-industrial setup of FIG. 7.

Figure 9:
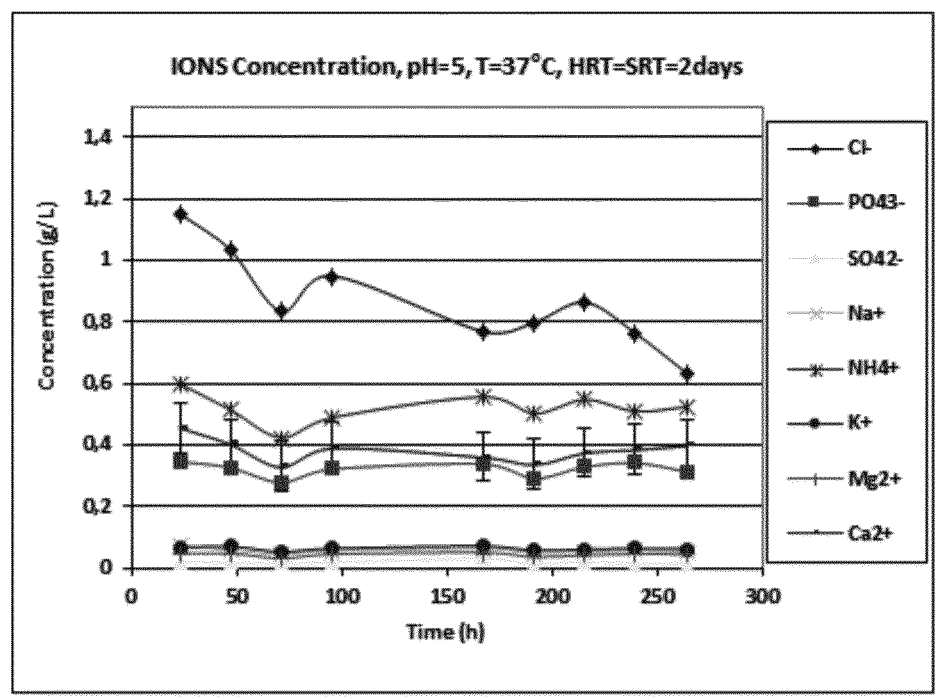

FIG. 9 represents the anions and cations concentration in function of time for a pH controlled at 5.

Figure 10:
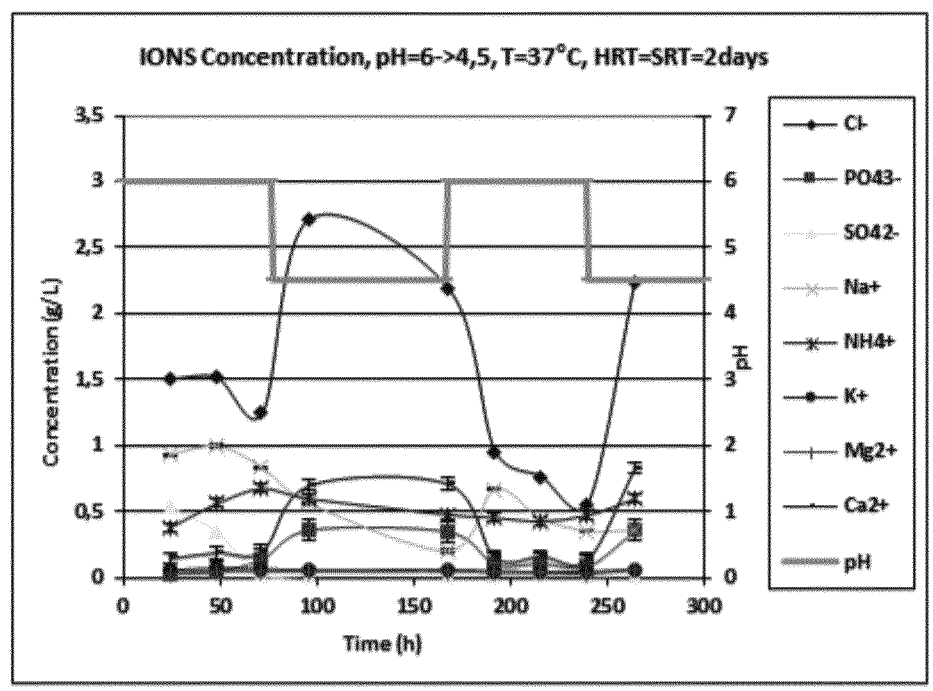

FIG. 10 represents the anions and cations concentration in function of time for a pH controlled at for a pH being alternatively equal to 6 and 4.5.

VI. DESCRIPTION OF EXEMPLARY EMBODIMENTS

With reference to FIG. 1, the method 1 for recovering phosphorus from a sludge to be treated 2 includes:

a stage of pre-acidification 10 of the sludge to be treated 2, giving a pre-acidified sludge 4;

a stage of bio-acidification 20 of said pre-acidified sludge 4, giving an acidified sludge 5; and, a stage of treatment 30 of said acidified sludge 5, giving a phosphorus depleted water 8 and recovered phosphorus 9.

The sludge to be treated 2 contains water, organic matter and phosphorous-based matter. It can originate directly from a production line, as for example industrial sludge, or from a wastewater treatment plant, as for example a primary settling sludge, a biological sludge, or a mix of both types of sludge.

The stage of pre-acidification 10 includes a step of adding carbon dioxide ($CO_2$) 3 into the sludge to be treated 2. The resulting sludge is called pre-acidified sludge 4.

The stage of pre-acidification 10 can be carried out in a contact chamber in which the carbon dioxide ($CO_2$) is injected to the sludge to be treated 2. The stage of pre-acidification 10 can also be carried out in a flotation reactor. The injection of carbon dioxide 3 in a flotation reactor enables to thicken the treated sludge during the stage of pre-acidification 10.

Carbon dioxide 3 can be recycled from cogeneration or from incineration off-gas of the wastewater treatment plant and is significantly cheaper than strong acids.

The stage of bio-acidification 20 includes a step of acidogenesis. Acidogenesis is a part of an anaerobic digestion in which the biomass transforms the organic matter into fatty acids, mainly into volatile fatty acids. Fatty acids are saturated or unsaturated carboxylic acids with an aliphatic chain. They are said "volatile" when their aliphatic chain comprises between two to six carbon atoms. Because of the production of fatty acids during acidogenesis, the pH of the pre-acidified sludge 4 further decreases during the stage of bio-acidification 20. The pH obtained at the end of the stage of bio-acidification 20 is comprised between 3.5 and 5.5, preferably between 4 and 4.5 and more preferably equal to 4. These values of pH are particularly favorable to the release of phosphates in the sludge.

The resulting sludge is called acidified sludge 5.

As the acidogenesis is carried out at a pH comprised between 3.5 and 5.5, which are optimum conditions for the biomass to convert organic matter into fatty acids, the transformation of organic matter into fatty acids is both complete and fast kinetically. Therefore, the hydraulic retention time of the reactor in which the bio-acidification is carried out, can be particularly short while ensuring a high conversion of organic matter into fatty acids. The hydraulic retention time is comprised between 1 day to 8 days, depending on the temperature.

The stage of bio-acidification 20 can be carried out in a sludge reactor designed for bio-acidification with a 1 day to 8 days hydraulic retention time.

An additional acid 3a, 3b can optionally be added during respectively the step of pre-acidification 10 and/or the step of bio-acidification 20 to further control the pH. The acid 3a or 3b can be a mineral acid, such as HCl, $H_2SO_4$ or $HNO_3$. These acids can be recovered from industrial waste. The acid 3a and/or 3b can also be an organic acid. The organic acid can be any organic substrate that will be qualified as easily biodegradable with a COD value higher than 0.3 g/g of product. These substrates can be by-product from Food & Beverage industries, additives manufacturers, fine chemicals, biomass residues, etc. The additional acid(s) can be in the form of liquid, gas or solid (powder).

The acid 3a and 3b is preferably a strong acid, namely an acid that is virtually 100% ionized in water. It offers the benefit of efficiently reducing the pH with a minimum amount of chemical added and of being ionized fast kinetically. In a preferred embodiment, the acid 3a is HCl.

The additional acid 3b added during the stage of bio-acidification 20 enables to further regulate the pH in function of the efficiency of acidogenesis in order to ensure optimum pH conditions for the acidogenesis. The additional acid 3b can be added simultaneously or successively with the acidogenesis.

Figure 2:
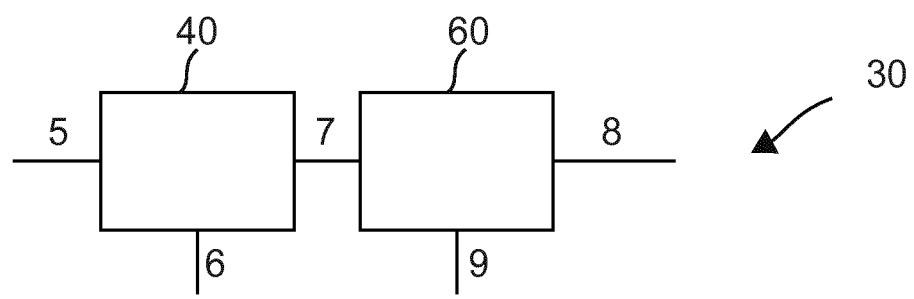
FIG. 2 represents a schematic view of the essential steps of the stage of treatment of the acidified sludge according to the method of FIG. 1.

With reference to FIG. 2, the stage of treatment 30 of the acidified sludge 5 includes:

a step of solid/liquid separation 40 of the acidified sludge 5, giving a slurry 6 and an acidified water 7; and, a step of recovery of phosphates 60 in liquid phase, giving a phosphorus depleted water 8 and recovered phosphorus 9.

The step of solid/liquid separation 40 can be chosen among any means of sludge dewatering, and preferably press filter, belt filter, or centrifugation.

The step of recovery of phosphates 60 is carried out after the step of solid/liquid separation 40. It is preferably carried out at a pH inferior to 7.5 in order to mitigate the addition of a basis, such as caustic soda.

According to a first embodiment, the step of recovery of phosphates 60 can be carried out by sorption (adsorption, ion exchange, ... ). The sorption can be on a non-regenerable or regenerable media, in situ or off site.

According to a second embodiment, the step of recovery of phosphates 60 can be carried out by crystallization of phosphates into a phosphate mineral. For the crystallization, calcium or magnesium products can be added in order to obtain a calcium phosphate (such as brushite) or a magnesium phosphate (such as struvite). As a magnesium product, $MgCl_2$ can be used. As a calcium product $Ca(OH)_2$ can be used. As the acidified sludge and/or water 5 is rich in organic matter, a step of digestion can be included in the stage of treatment 30. The step of digestion is carried out after the step of solid/liquid separation 40.

With reference to FIGS. 3a and 3b, according to a first embodiment, the step of digestion can be carried out in liquid phase before 51 or after 52 the step of phosphorus recovery 60. As the liquid phase contains dissolved organic matter, and in particular low fatty acids, the digestion 51, 52 is a methanization, giving a biogas 510, 520 containing methane and carbon dioxide. The methanization can be carried out in an Upflow Anaerobic Sludge Blanket reactor or an Anaerobic Moving Bed Biofilm Reactor. The methanization features a superior biogas yield compared to a mere methanization carried out without prior stage of pre-acidification 10 and/or stage of bio-acidification 20.

With reference to FIGS. 4 and 5, according to a second embodiment, the step of digestion 53, 54 is carried out on the slurry 6, giving a biogas 530, 540 and a digested slurry 531, 541. The step of digestion 53, 54 can be carried out in a Mesophilic digestor, a Thermophilic Digestor, a Thermal Lysis Digestion Reactor or an Anaerobic Digestion Membrane Reactor. The digestion 53, 54 features a superior biogas yield compared to a mere digestion carried out without prior stage of pre-acidification 10 and/or stage of bio-acidification 20.

As shown by FIG. 5, the phosphorus depleted water 8 can advantageously be mixed to the slurry 6 for the step of digestion 54.

With reference to FIG. 6, when digestion is not available on a treatment plant, the acidified water 7 can be sent to a mainstream wastewater treatment biological system 70. The step of recovery of phosphates 60 in liquid phase is then carried out downstream of the mainstream wastewater treatment biological system 70. In particular, the wastewater treatment biological system 70 can include an activated sludge reactor, a Moving Bed Biofilm Reactor, a Membrane Bio Reactor or a Sequenced Batch Reactor.

VII. EXPERIMENTAL DATA—PRE-ACIDIFICATION

Trials have been both conducted in lab and semi-industrial pilot scales, with the aim i) to assess the impact of environmental parameters (pH, $CO_2$ injection) and ii) to develop a control strategy to optimize the VFA production and stability and also to release phosphorus as P—PO4 (phosphates).

Therefore, a cascade structure has been developed to control the system by using $CO_2$ flow as an actuator. This approach is new in the sense that the $CO_2$ is used as the driver for pH adjustment and production of VFA. Moreover, the control algorithm optimizes the $CO_2$ consumptions and achieves better performances in terms of VFA production and phosphorous release.

VII.1-PILOT SEMI-INDUSTRIAL SETUP

The pilot semi-industrial setup is presented on FIG. 7. It comprises an anaerobic digestion tank having stirring means. The anaerobic digestion tank can be fed with sludge. $CO_2$ and HCl can be added in the tank. The injection of $CO_2$ is part of a recirculation loop/measuring circuit. A biogas analyzer measures the content of biogas ($CO_2$, $CH_4$, $H_2$, $H_2S$). A VFA analyzer measures the VFA content. The content of cations and anions of the acidified sludge has also been analyzed on filtrate (after sludge separation) by ionic chromatography.

VII.2-CARBON DIOXIDE INJECTION SYSTEM

Details of the carbon dioxide injection system are shown on FIG. 8.

Preliminary tests for estimating the gas-liquid transfer of $CO_2$ have been carried out on the tank in order to find an efficient mode of diffusion of $CO_2$. The results of these tests showed that the diffusion of $CO_2$ through a "fine bubbles" diffuser installed in the tank's recirculation loop/measuring circuit improves the gas-liquid transfer of $CO_2$ compared with a direct injection of $CO_2$ into the tank. The control of the $CO_2$ injection is ensured by a EPFLOW-type mass flowmeter. The $CO_2$ flow rate to be injected into the reactor is set either at the supervision level (supervisory control system) or locally at the ELFLOW local display.

VII.3-INLET SLUDGE CHARACTERISTICS

The total phosphorous concentration in the inlet sludge to be treated was 0.51 g/L.

VII.4-MEASUREMENTS OF CATIONS AN ANIONS

Sludge retention (SRT) was set on 2 days, and pH conditions was adjusted thanks to $CO_2$ and/or mineral acid injection along the 10 days period (>240 hr).
More precisely, pH has been adjusted by 2 levers:
  $CO_2$ injection (between 0.3 to 0.8 nL/min); and,
  HCl at 0.1 mol/L
Cations and anions values have been analyzed in parallel of VFA production (after sludge separation).

FIG. 9, respectively FIG. 10, shows the anion/cation content in function of time for a pH controlled at 5, respectively for a pH being alternatively equal to 6 and 4.5.

As can be seen on FIG. 9, the concentration of soluble P—PO4 is steady around 0.3-0.38 g/L at pH equal to 5.

As can be seen on FIG. 10, the concentration of soluble P—PO4 ranges from 0.3 to 0.45 g/L at pH equal to 4.5 and is almost equal to 0 when pH is increased to a pH equal to 6. These values have been consistent over the 10 days testing period. This represents between 60 to 90% of phosphorous being solubilized under lower pH conditions and efficient control of $CO_2$-acid injection.

VII.5-CONCLUSION

The production increase of VFA and desorption of P from the inlet sludge up to 90% have been observed and monitor during the experiments. The precise mechanism is still to be fully understood and tested, a few conclusions can be drawn:
  injection of $CO_2$ with an efficient control system allows decreasing the pH of the digestion close to the pKa of $CO_2$ (6.3). Carbon dioxide acts as a "pH buffer", compensating the inlet fluctuation and stabilizing the acidification process. It also helps the speciation of VFA (partly converting some species such as butyric acid to acetic acid), which results to an increase of VFA up to 48%;
  with a lower and stabilized pH at low values (6.3), the mineral acid consumption (HCl) used to decrease further down to 4.5 is minimized;
  P—$PO_4$ solubilization under such conditions reaches an efficiency above 60% (up to 90% measured);

Combined with a VFA increase (which enhances biogas production in anaerobic digester), the phosphorus release is improved by the combination of $CO_2$ and acidification reactor versus conventional acidification process.

Carbon dioxide being a "by-product" from biogas purification, it can significantly reduce the OPEX involved in existing process, by reducing mineral acid usage and boost the biogas production by increasing VFA production.

The invention claimed is:
1. Method for recovering phosphorus from sludge to be treated, said method including:
  a stage of pre-acidification of said sludge to be treated, giving a pre-acidified sludge, wherein the stage of pre-acidification includes a step of adding an acid into said sludge to be treated, said step of adding an acid into said sludge including injecting carbon dioxide into said sludge to yield a pre-acidified sludge having a pH equal to or less than 6.3;
  a stage of bio-acidification of said pre-acidified sludge, giving an acidified sludge, wherein the stage of bio-acidification includes a step of acidogenesis and is carried out in a reactor having a hydraulic retention time comprised between 1 day to 8 days and, at a pH comprised between 3.5 to 5.5; and,
  a stage of treatment of said acidified sludge including:
    a step of solid/liquid separation of said acidified sludge, giving a slurry and an acidified water; and,
    a step of recovery of phosphates in liquid phase by sorption and/or crystallization, giving a phosphorus depleted water, said step of recovery of phosphates being carried out after said step of solid/liquid separation.
2. Method according to claim 1, wherein the stage of pre-acidification is performed in a flotation reactor.

3. Method according to claim 1, wherein the stage of pre-acidification and/or the stage of bio-acidification include(s) a step of adding an additional acid chosen among strong acid or organic co-substrate to further control the pH.

4. Method according to claim 1, wherein the carbon dioxide added during the stage of pre-acidification is recycled from cogeneration or from incineration off-gas.

5. Method according to claim 1, wherein the stage of treatment of said acidified sludge further includes a step of digestion in liquid phase giving a biogas and a digested liquid and,
  wherein said step of digestion is a methanization and is carried out prior or after said step of recovery of phosphates.

6. Method according to claim 1 wherein the stage of treatment of said acidified sludge further includes a step of digestion of said slurry giving a biogas and a digested slurry.

7. Method according to claim 6, wherein said phosphorus depleted water is added to said slurry for the step of digestion of said slurry.

8. Method according to claim 6, wherein the digested slurry is, at least partly, recycled and mixed with the pre-acidified sludge.

9. Method according to claim 1, wherein said acidified water is sent to a mainstream wastewater treatment biological system and,
  wherein said step of recovery of phosphates in liquid phase is carried out downstream of said mainstream wastewater treatment biological system.

10. Method according to claim 1, wherein the stage of treatment of said acidified sludge includes a step of post-acidification, and
  wherein said step of post-acidification is carried out prior to said step of recovery of phosphates in liquid phase.

11. Method according to claim 1, wherein said method includes a stage of advanced control of pH of said stage of pre-acidification and/or said stage of bio-acidification and,
  wherein said stage of advanced control takes into account at least one parameter, said at least one parameter being chosen among: the pH for said stage of pre-acidification, the pH for said stage of bio-acidification and the phosphorus recovery performance for said step of recovery of phosphates.

12. Method according to claim 11 wherein the at least one parameter can be further chosen among: the pH for a step of digestion and a biogas recovery performance.

13. Plant for recovering phosphorus from sludge to be treated according to a method according to claim 1, wherein said plant includes:
  a contact chamber and means for injecting acid into the sludge to be treated, said acid being carbon dioxide and pre-acidified sludge being formed in said contact chamber having a pH equal to or less than 6.3,
  a sludge reactor adapted for bio-acidification with a hydraulic retention time comprised between 1 day to 8 days,
  means of solid/liquid separation, and
  means of phosphorus recovery adapted to recover phosphorus from a liquid phase.

14. Plant according to claim 13 further including a digestor or a methanizer reactor.

15. Method for recovering phosphorus from sludge to be treated, said method including:
  a stage of pre-acidification of said sludge to be treated, giving a pre-acidified sludge, wherein the stage of pre-acidification includes a step of adding an acid into said sludge to be treated, said step of adding an acid into said sludge including injecting carbon dioxide into said sludge to yield a pre-acidified sludge having a pH equal to or less than 6.3;
  a stage of bio-acidification of said pre-acidified sludge, giving an acidified sludge, wherein the stage of bio-acidification includes a step of acidogenesis and is carried out in a reactor having a hydraulic retention time comprised between 1 day to 8 days and, at a pH comprised between 3.5 to 5.5; and,
  a stage of treatment of said acidified sludge including:
    a step of solid/liquid separation of said acidified sludge, giving a slurry and an acidified water;
    a step of recovery of phosphates in liquid phase by sorption and/or crystallization, giving a phosphorus depleted water, said step of recovery of phosphates being carried out after said step of solid/liquid separation,
    wherein said acidified water is sent to a mainstream wastewater treatment biological system and wherein said step of recovery of phosphates in liquid phase is carried out downstream of said mainstream wastewater treatment biological system.

\* \* \* \* \*